US00RE33914E

United States Patent [19]

Robillard

[11] E Patent Number: Re. 33,914

[45] Reissued Date of Patent: May 5, 1992

[54] INFRARED IMAGING SYSTEM AND METHOD

[75] Inventor: Jean J. A. Robillard, El Paso, Tex.

[73] Assignee: Richard L. Scully, Charlottesville, Va.

[21] Appl. No.: 533,445

[22] Filed: Jun. 5, 1990

Related U.S. Patent Documents

Reissue of:

[64] Patent No.: 4,751,387
Issued: Jun. 14, 1988
Appl. No.: 815,810
Filed: Jan. 2, 1986

[30] Foreign Application Priority Data

Jan. 7, 1985 [IE] Ireland ..... 34/85

[51] Int. Cl.[5] ..... G02F 1/13

[52] U.S. Cl. ..... 250/331; 250/330; 359/37

[58] Field of Search ..... 250/331, 330; 350/352, 350/351

[56] References Cited

U.S. PATENT DOCUMENTS 3,114,836 12/1963 Fergason et al. ..... 250/331
4,917,476 4/1990 Makh et al. ..... 250/331

FOREIGN PATENT DOCUMENTS 1120093 6/1966 United Kingdom .
1387276 1/1972 United Kingdom .
1408059 10/1972 United Kingdom .
1442802 2/1973 United Kingdom .
1453134 1/1974 United Kingdom .
2152691 8/1984 United Kingdom .
2163566 8/1985 United Kingdom .

*Primary Examiner*—Carolyn E. Fields

[57] ABSTRACT

An infrared imaging system includes a film of dichroic [liquid crystal] *material* coated on a membrane, first means for forming an infrared image on the membrane, second means for illuminating the membrane with visible light, and third means for detecting variations in elliptical polarization of the light after reflection from or transmission through the membrane to provide a visible image.

20 Claims, 6 Drawing Sheets

INFRARED IMAGING SYSTEM AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an infrared imaging system and method.

2. Description of Background Art

Existing infrared imaging systems can be classified into two main categories:

(a) Systems with mechanical scanning which sequentially project each point of the IR image onto a single detector. This type is the most common. It generally operates in the 10 microns range, the detector being cooled with liquid air or liquid nitrogen.

(b) Imaging tubes with a detector array where the elements of the array are scanned with an electron beam. This type of imaging device generally operates in the near infrared and requires an infrared source to illuminate the object.

Materials such as Doped Germanium or Indium Antimonide are used for detection in the former case, and Germanium or a pyroelectric material in the latter.

Systems of type (a) are complicated, bulky, expensive and require professional maintenance. Systems of type (b) are more compact and robust. They have no moving parts which simplifies the maintenance. Unfortunately their performance is limited to the near infrared.

SUMMARY AND OBJECTS OF THE INVENTION

It is therefore an object of the present invention to provide an infrared imaging system and method which does not use mechanical or electronic scanning, which operates at room temperature, and which may therefore be constructed with a considerable reduction in size and price compared with conventional systems.

Accordingly, the present invention provides an infrared imaging system comprising a film of dichroic liquid crystal coated on a membrane, first means for forming an infrared image on the membrane, second means for illuminating the membrane with visible light, and third means for analysing the polarization of the light after reflection from or transmission through the membrane to provide a visible image.

The invention also provides an infrared imaging method comprising providing a film of dichroic liquid crystal coated on a membrane, forming an infrared image on the membrane, illuminating the membrane with visible light, and analysing the polarization of the light after reflection from or transmission through the membrane to provide a visible image.

The invention makes use of the dichroism of certain liquid crystals coated on a membrane, in particular cholesteric liquid crystals. When the membrane is exposed imagewise to infrared radiation local variations of index of refraction in the liquid crystal film are produced according to the image projected. The transmission or reflection of light through the membranes produces an elliptically polarized light and the variable index pattern in the liquid crystal film causes variations of ellipticity which can be converted into variations in visible light intensity through the detecting means (detector).

The visible light which illuminates the membrane may be plane or elliptically polarized, in which case the detector will detect changes in the elliptical polarization resulting from the action of the liquid crystal. On the other hand, the illuminating light may be unpolarized, in which case the detector will detect the degree of elliptical polarization produced by the liquid crystal. In both cases the analyzer, typically a quarter wave plate and polarizer, will produce a visible image with variations in intensity corresponding to the variations in refractive index of the liquid crystal.

Where the visible light is transmitted through the membrane to the detector the membrane should be transparent to such light and it is immaterial whether the light is directed at the membrane from the side carrying the liquid crystal or from the opposite side. However, where the visible light is reflected from the membrane the latter should have a reflective coating on the side opposite the liquid crystal, with the light being directed at the membrane from the same side as the liquid crystal.

BRIEF DESCRIPTION OF THE DRAWINGS

Embodiments of the invention will now be described, by way of example, with reference to the accompanying drawings, wherein.

DETAILED DESCRIPTION OF THE PREFERRED EMBODIMENTS

Figure 1:
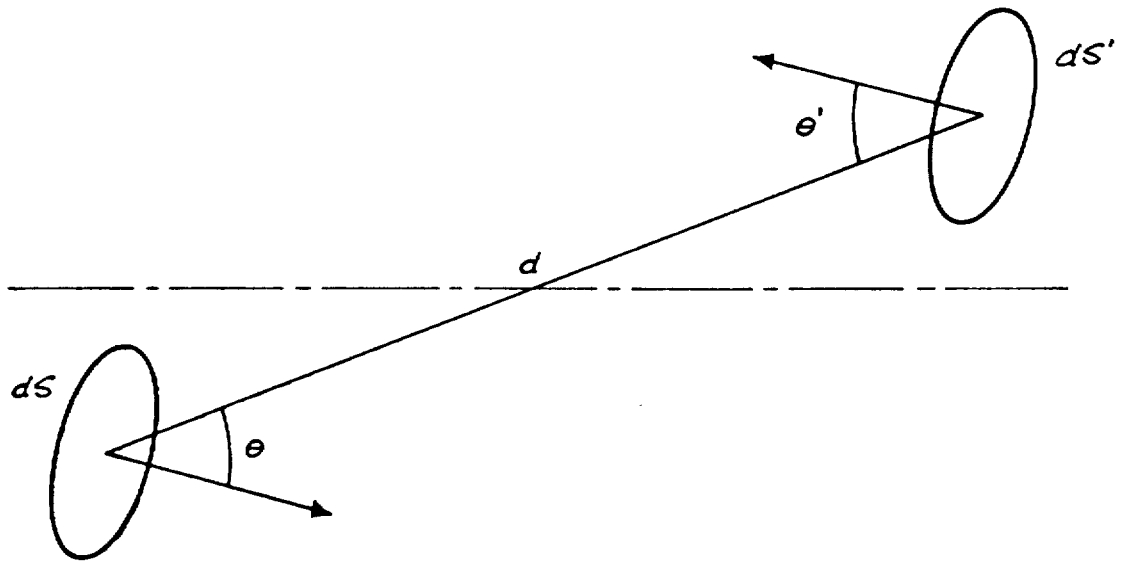
FIG. 1 shows the correspondence between an area ds in the aperture of an objective and an area ds' on a liquid crystal film, the perpendicular to the element ds making an angle $\theta$ with the direction ds-ds' and the perpendicular to the element ds' making an angle $\theta$ with the same direction.

It is well known that the optical properties of liquid crystals can be affected by very small amounts of energy, both nematic and cholesteric liquid crystals undergoing changes in refractive index with input energy of the order of $10^{-14}$ W sec/cm. Present efforts have been directed to the use of electrical energy for optical displays and thermal energy in temperature sensors and thermal mapping. However, it would be desirable to use the extreme sensitivity of liquid crystals for the detection and measurement of all kinds of radiant energies, particularly infrared energy where in the form of a thin film they would be appropriate for imaging systems. The sensitivity already achieved for thermal measurement would suggest that a ten fold improvement in detectivity over present infrared detection and imaging system would be achieved. It would also have the advantage of simplicity and of being operable at room temperature whereas the most sensitive infrared cameras have to operate at liquid nitrogen temperature and use complicated mechanical scanning systems. The best way to benefit from the remarkable sensitivity of liquid crystals for the purpose of infrared imaging would be to convert directly the absorption of infrared energy by the material into a change of refractive index that will directly modulate the transmission or reflection of light in a display configuration. In other words a thin liquid crystal film should play the dual role of infrared detection target and display screen. To optimize this function a small change in refractive index should correspond to a relatively large change in transmission or reflection of the medium. This stringent condition is fortunately encountered in certain types of liquid crystals which are dichroics. Dichroism is a phenomenon by which a light wave transmitted by the material is decomposed in two circular waves of opposite directions (left and right) with amplitudes:

$$A_r = (A/2)\exp(-2\pi\nu\mu_1)d$$

and $$A_l = (A/2)\exp(-2\pi\nu\mu_2)d$$

where $A_r$ is the amplitude of the right wave $A_l$ is the amplitude of the left wave $\nu$ is the frequency of the light $\mu_1$ and $\mu_2$ are the optical absorption of the medium d is the thickness of the film.

Because of the two different values of $\mu_1$ and $\mu_2$ the transmitted wave is elliptical.

In liquid crystals, particularly in certain cholesterics, the dichroism is very important and the ellipticity of the transmitted light is large. The ellipticity is an optical characteristics which depends very strongly on the index of refraction and the thickness of the film. Then, small changes in this parameter will translate into large changes in ellipticity. This dependency can be expressed by the amplitude of the two components $E_p$ and $E_s$ of the electrical vector E of the transmitted light wave:

$$E_p = A_p \exp j(\omega t + \delta_p)$$

$$E_s = A_s \exp j(\omega t + \delta_s)$$

$E_p$: component parallel to the plane of incidence of the wave $E_s$: component perpendicular to the plane of incidence.

Both the phases $\delta$ and the amplitudes A of the two components will be affected. These changes are best characterised by two parameters $\Delta$ and $\psi$ such as:

$$\mathrm{tg}\psi \exp j\Delta = f(n_o, \alpha_o, n, d)$$

where $n_o$ is the index of refraction $\alpha_o$ is the angle of incidence n is the index of refraction of the liquid crystal d is the thickness of the film.

The measurement of the ellipticity of the light transmitted by the liquid crystal film may be performed by an analytical set consisting of a quarter wave plate and a polarizer. The quarter wave plate converts the elliptically polarized light into two plane polarized lights which can be extinguished by the polarizer. If the polarizer is set in such a way that complete extinction is occurring when no IR is falling upon the liquid crystal then, upon receiving IR illumination, the refractive index of the liquid crystal will be changed and provide a shift of the extinction angle or, if the polarizer is fixed, an increase in transmission. If an infrared image is projected onto the liquid crystal film the change of refractive index will vary over the surface of the film thus giving rise to a variable transparency and the formation of an image in the visible spectrum.

Referring now to FIG. 1, to evaluate the sensitivity to infrared radiation of a liquid crystal imaging system, consider a liquid crystal film isolated in space and some optic projecting an infrared image on this film. To any point of the IR image will correspond a disc of surface dS corresponding to the diffraction disc of the optic. The corresponding elementary volume of liquid crystal concerned will be dV = e dS, e being the thickness of the film. The radius r of the diffraction disc is given by the expression:

$$r = \frac{1.22\,\lambda F}{H}$$

which for an aperture of F: 2 and a wavelength, $\lambda$ or $10\mu$ gives:

$$r = 24 \text{ microns}$$

The diffraction disc having a surface dS of approximately 50 microns, the volume dV absorbing the IR energy emitted by the image point will be edS for a thickness e of 20 millimicrons or:

$$dV = \pi r^2 e = \pi(24)^2\, 10^{-8} \times 20\, 10^{-7} = 3.6\, 10^{-11}\ \mathrm{cm}^3$$

The heat capacity of the liquid crystal is generally of the order of 1.5 J/cm$^3$. This indicates that to increase the temperature of dV of 1° C. the energy necessary is: 5.4 $10^{-11}$J. This quantity corresponds to a sensitivity of 5.4 $10^{-10}$ Watts if the change in temperature is registered in 0.1 sec. (value required for a camera with 10 images per second).

The energy emitted by the infrared scene and entering the aperture of the infrared imaging system can be evaluated considering an element dS of the source radiating infrared energy over an element dS' of the liquid crystal film. The relation between the luminance L on the surface dS and the luminous flux $\phi$ emitted by the surface dS is:

$$d^2\phi = \frac{L\,ds\,ds'\cos\theta\cos\theta'}{d^2}$$

where $\theta = \theta'$, $\theta$ and $\theta'$ being the angle between the perpendiculars to the surface ds and ds' respectively and the direction of propagation (See FIG. 1) and d the distance between ds and ds'.

The luminance is given by the law of Black-Body radiation:

$$dL_\lambda = \frac{C\lambda^{-2}}{\exp(C_2/\lambda T)}\, d\lambda$$

which has to be integrated over the spectral range. Assuming that all the radiative energy emitted by ds is received by ds', then the total luminance L is given by Stefan's Law:

$$L = \sigma T^4$$

If the object providing the image is at room temperature (300 K.), the total luminance emitted in space by this object is:

$$L = 1.8\ 10^{-8}(3\ 10^2)^4 \mathrm{Wm}^{-2}\,\mathrm{sr}^{-1}$$

or $$L = 150\ \mathrm{Wm}^{-2}\,\mathrm{sr}^{-1}$$

The flux $\phi$ received by the element ds of the LC film is then:

$$\phi = L\frac{ds\,ds'}{d^2} = \frac{\pi}{4}(2h)^2\frac{1}{d^2}L \text{ or, for:}$$

$$H = 2.5,\ h = 2.5\ 10^{-2} \text{ and } d = 10$$

$$\phi = 6\ 10^{-8}$$

which is compatible with the sensitivity of the film.

Figure 2:
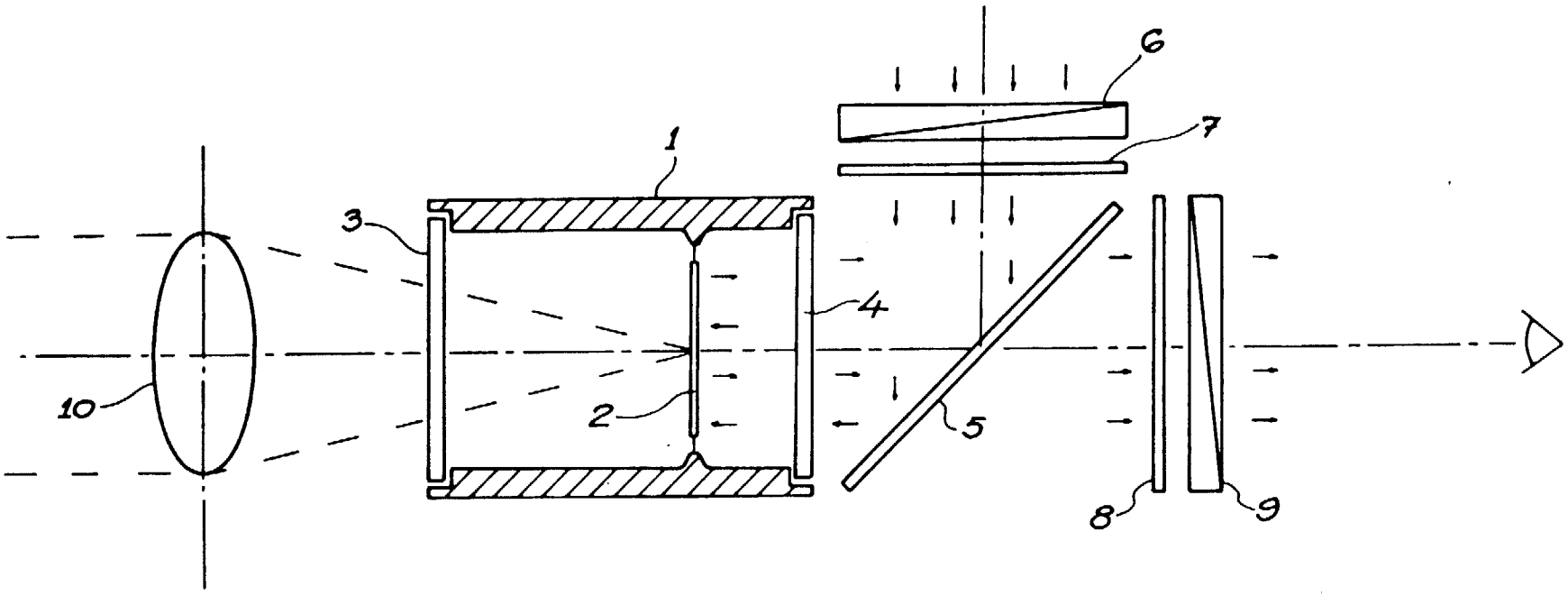
FIG. 2 is a cross-section through a first embodiment of the invention operating by the reflection of polarized incident visible light.

Referring now to FIG. 2, the infrared imaging system comprises a housing 1 containing therein a membrane 2 supporting a dichroic liquid crystal film, the housing being closed by an infrared window 3 at one end and an optical window 4 at the other. The elements 2, 3 and 4 are all parallel and transverse the axis of the housing 1. The housing is evacuated to a low pressure, typically $10^{-6}-10^{-7}$ mm of Hg, to avoid internal thermal currents, and the interior walls are preferably made reflective so that the housing is effectively a black body and does not of itself cause thermal gradients across the membrane 2.

An infrared image at infinity is focussed by an objective 10 through the infrared window 3 onto the membrane 2 supporting the liquid crystal film thereby producing local variations of the refractive index of the film. A visible light beam from a source (not shown) is polarized by a polarizer 6 and provides a polarized light after crossing a quarter wave plate 7. The light is then reflected through the optical window 4, by a semitransparent mirror 5 disposed at 45° to the axis of the housing 1, onto the membrane 2 supporting the liquid crystal film. The latter being dichroic, causes the light reflected back by the membrane to be elliptically polarized if the orientation of 6 with respect to 7 is such that the light incident on the film is plane polarized or with a variation of ellipticity if the orientation of 6 with respect to 7 is such that the incident light is elliptical. In both cases the surface variations of the refractive index in the liquid crystal film due to the infrared absorption provides variations of ellipticity of the light reflected by the membrane, this variation being distributed over the surface of the film in direct relationship with the intensity of the infrared image received by the film. The light reflected by the membrane 2 is viewed through optical window 4 and the semitransparent mirror 5 by an detector consisting of a quarter wave plate 8 followed by a polarizer 9.

Figure 6:
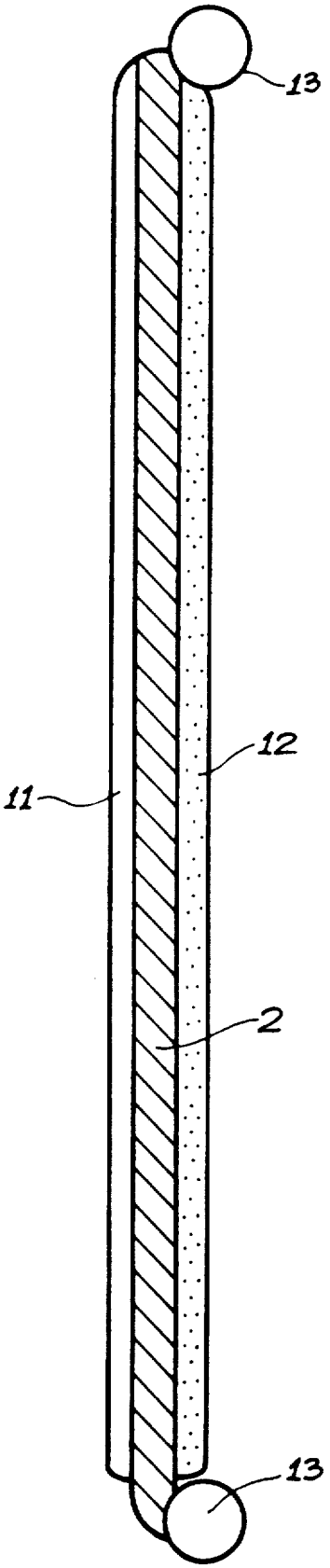
FIG. 6 is a detailed cross-sectional view of the membrane and liquid crystal layer used in the embodiments of FIGS. 2 and 3.

The membrane 2 and the liquid crystal film of FIG. 2 are shown in greater detail in FIG. 6. The membrane 2 consists of a thin flat sheet of transparent plastics material stretched over a metal ring 13 which is secured to the interior sidewalls of the housing 1. The liquid crystal film 11 is applied to that surface of the membrane which faces the optical window 4, the opposite surface of the membrane being coated with carbon black 12 for reflection of the visible light from the membrane. Examples of the materials which may be used for the membrane 2 and liquid crystal will be given later, together with examples of materials which may be used for the other components of the system.

Figure 3:
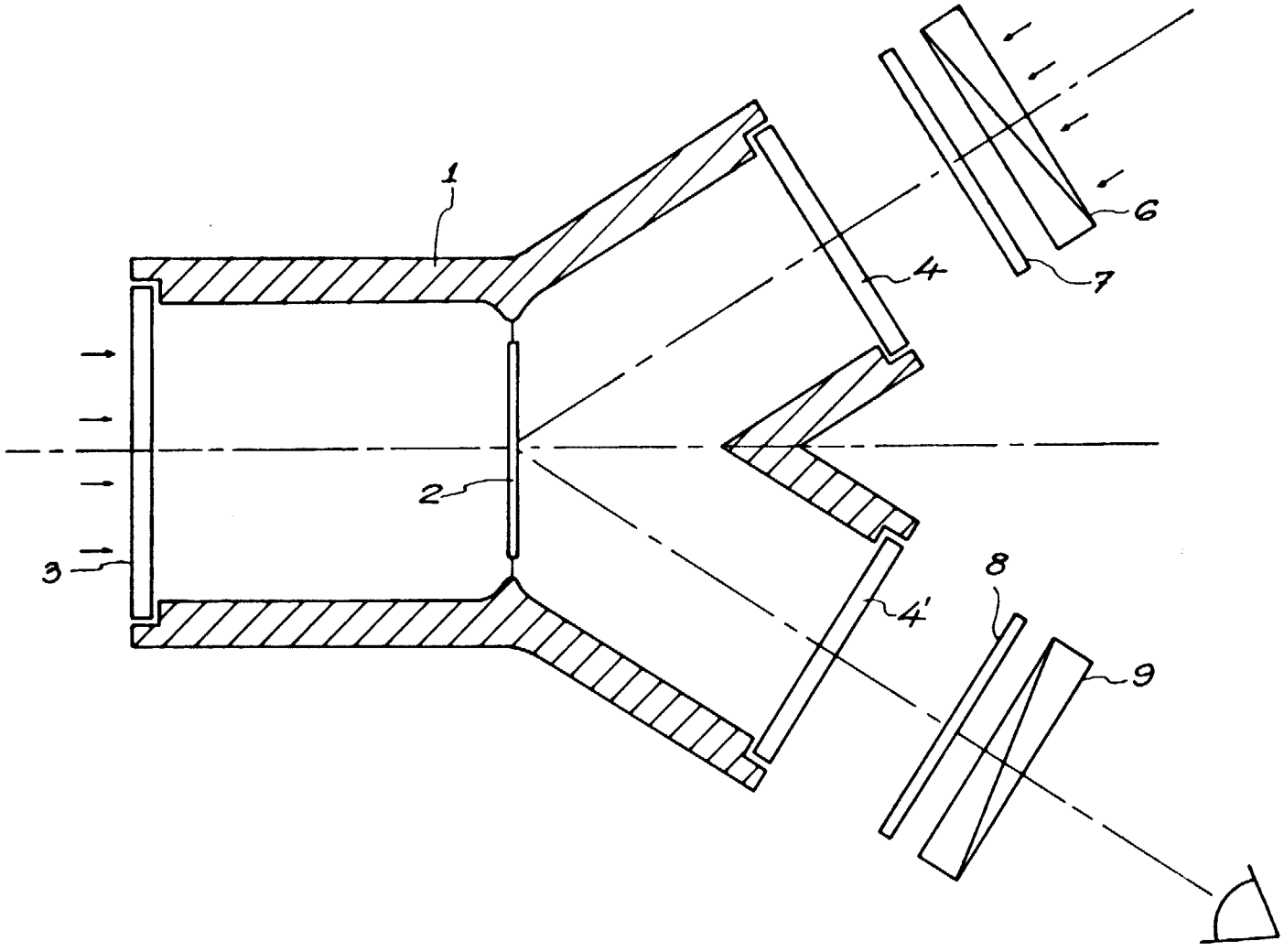
FIG. 3 is a cross-section through a second embodiment of the invention also operating by the reflection of polarized incident visible light.

In FIG. 3 the housing 2 has two optical windows 4 and 4' for infrared imaging by reflection of light at a 60° angle from the plane of the liquid crystal film. Visible incident light is reflected from the membrane 2 after crossing a polarizer 6, a quarter wave plate 7 and the optical window 4. The reflected light is viewed through the optical window 4, a quarter wave plate 8 and a polarizer 9. An infrared image is projected onto the membrane 2 carrying the liquid crystal film through an infrared window 3. The local modulation of the index of refraction in the liquidcrystal film due to the infrared absorption provides a variation of ellipticity of the elliptical light reflected on the membrane 2. This variation of ellipticity is converted to a variation in visible light intensity through the quarter wave plate 8 and polarizer 9 properly oriented. The membrane 2 is constructed as for the embodiment of FIG. 2, the liquid crystal layer 11 being provided on the surface facing the optical windows 4 and 4' and the carbon black 12 on the surface facing the infrared window 3.

Figure 4:
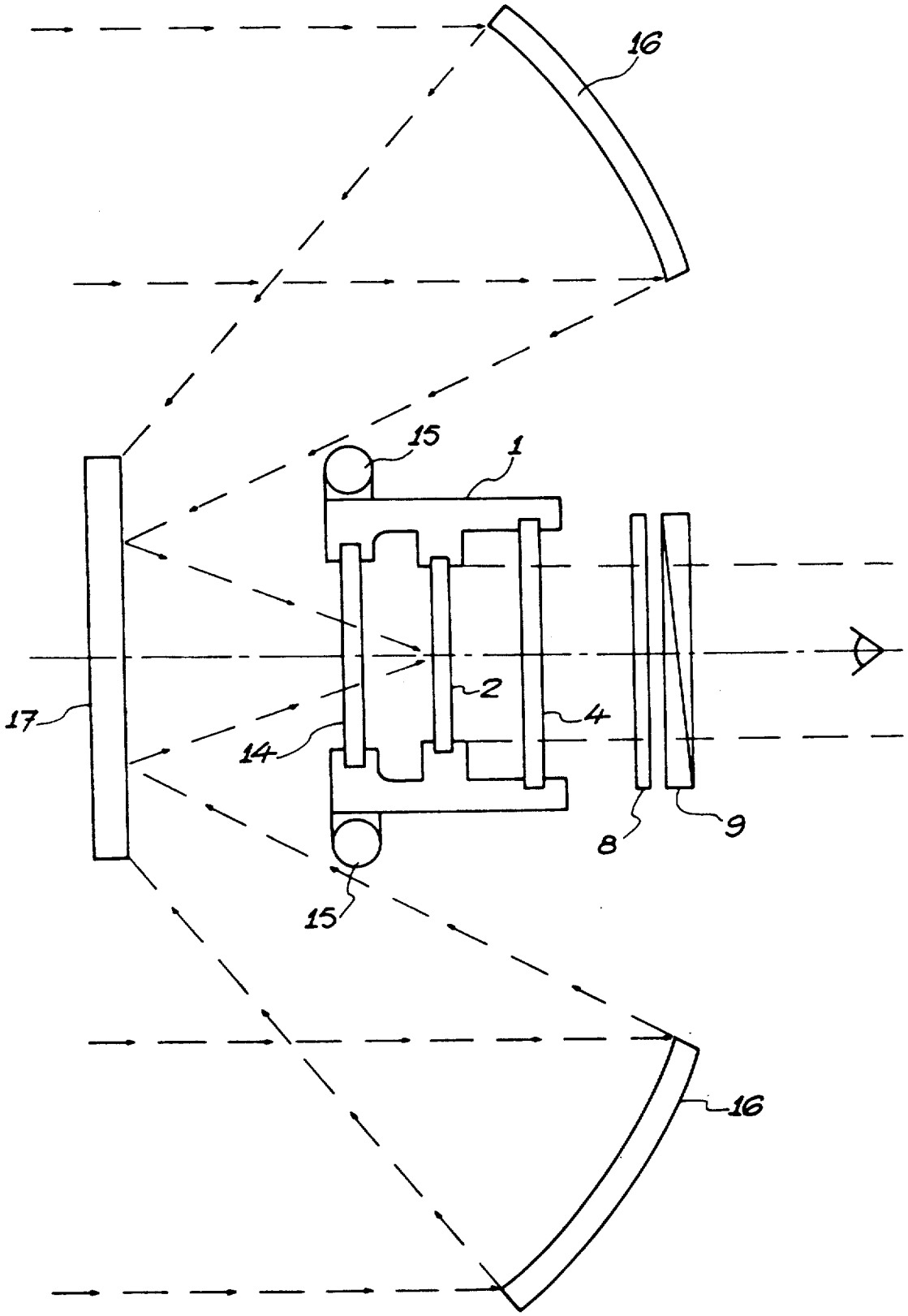
FIG. 4 is a cross-section through a third embodiment of the invention operating by the transmission of unpolarized visible light.

FIG. 4 represents an infrared imaging system with a catoptric objective comprising a segmented parabolic mirror 16 focussing an infrared image of an object at infinite distance onto a membrane 2 supporting a liquid crystal film by reflection at a plane surface 17 and through a combined infrared/optical window 14. An annular source of unpolarized light 15 external to the housing 1 illuminates the liquid crystal film also by reflection from 17 through the window 14. The infrared image on the membrane 2 is viewed through an optical window 4, a quarter wave plate 8 and a polarizer 9.

Figure 7:
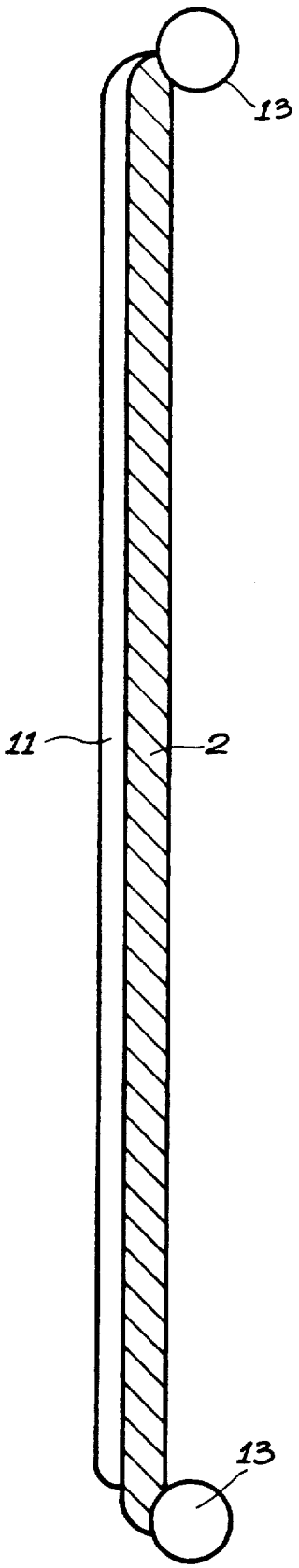
FIG. 7 is a detailed cross-sectional view of the membrane and liquid crystal layer used in the embodiments of FIGS. 3 and 4.

In this case it will be observed that the incident light from 15 is not reflected by the membrane 2 but is transmitted through it to the optical window 4. Accordingly, the carbon black layer 12 shown in FIG. 6 is omitted and the membrane 2 and liquid crystal film 11 are as shown in FIG. 7. Preferably, the liquid crystal 11 is coated on the surface of the membrane 2 which faces the incident infrared radiation, i.e. the window 14.

Figure 5:
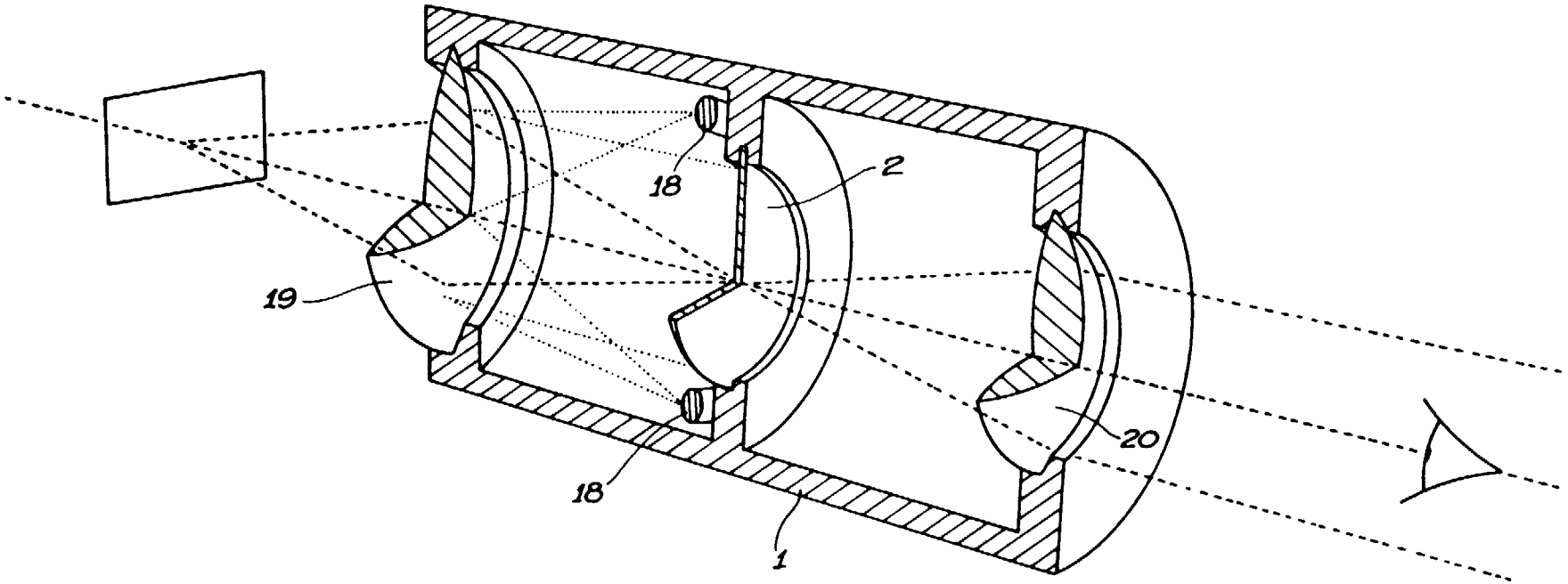
FIG. 5 is a perspective sectioned view of a fourth embodiment of the invention also operating by the transmission of unpolarized visible light.

FIG. 5 represents an infrared imaging system with an objective lens 19 for infrared radiation projecting the image of an infrared object at infinite distance onto a membrane 2 supporting a liquid crystal film and mounted in an evacuated housing 1. An annular light source 18 internally of the housing illuminates the membrane 2 by reflection from the inner surface of the infrared objective 19. The visible light transmitted through the membrane 2 is viewed through an optical window 20 in the form of a further lens followed by a quarter wave plate and a polarizer (not shown). In this case it will be noted that the infrared and optical windows which seal the opposite ends of the housing 1 are both in the form of lenses, i.e. the lenses 19 and 20.

As in the case of FIG. 5, the light from the source 18 is transmitted through the membrane 2 and not reflected by it, and therefore the membrane and liquid crystal film have the structure shown in FIG. 7. As before, it is preferred that the film 111 is coated on the surface of the membrane 2 which faces the incident infrared radiation, i.e. the objective 19.

The material used for the windows providing infrared transmission at 10 microns such as window 3 of FIGS. 2 and 3 is preferably germanium with a thickness of from 1 to 5 mm. The material used for the window 14 of FIG. 4 providing transmission both in the infrared and visible is preferably sodium chloride or calcium fluoride. The material used for optical windows providing transmission in the visible spectrum such as window 4 of FIGS. 2 to 4 is preferably ordinary optical glass. Finally, the material used for the fabrication of objective lenses for infrared imaging such as lenses 10 and 19 in FIGS. 2 and 5 is preferably germanium.

The material used for the fabrication of the quarter wave plates is generally mica but any transparent material with proper thickness and refractive index can alternatively be used.

The polarizers used in the infrared system will be preferably of the "Polaroid" type because of the large diameter needed.

More sophisticated polarizers such as Glan Thompson prisms can alternatively be used but the price of such component will generally restrict the diameter available and the field of view.

The membrane holding the liquid crystal film can be made of various polymers such as Mylar, Farmvar, colloidion, nylon, etc. with a thickness varying from between one and fifty microns. For faster response, membranes made of materials such as the ones described in U.S. Pat. No. 2,617,513 will be preferred. Materials will then be beryllium oxide or silica with a thickness varying from 0.1 to 10 microns.

Liquid crystals used in the invention are preferably cholesteric materials chosen among the cholesteryl esters including cholesteryl acetate, carbonate, chloride, nanoate, nonanoate, decanoate, dodecanoate, oleate, propionate, laurate, etc. used individually or as a mixture of crystals. These have a high surface tension and may be coated on the membrane in conventional manner by applying a drop of the liquid crystal to the membrane and rolling with a glass rod. The preferred thickness of the liquid crystal film is 5 to 50 millimicrons with 20 millimicrons being preferred.

For thermal compatibility the membrane should have a specific heat $C_p$ and thermal conductivity K close to that of the liquid crystal material used. For example, for Mylar one has:

$$C_p = 0.315 \text{ Cal/g/°C}$$

$$K = 3.63\ 10^{-4} \text{ Cal/sec./cm/°C}$$

The corresponding parameters for cholesteryl propionate liquid crystal are:

$$C_p = 0.46 \text{ Cal/g/°C}$$

$$K = 10^{-4} \text{ Cal/sec./cm/°C}$$

I claim:

1. An infrared imaging system comprising a film of dichroic [liquid crystal] *material* coated on a membrane, first means for forming an infrared image on the membrane, second means for illuminating the membrane with visible light, and third means for detecting variations in elliptical polarization of the light after reflection from or transmission through the membrane to provide a visible image.

2. A system according to claim 1, wherein the membrane is contained within an evacuated housing, the housing including an optical window and an infrared window.

3. A system according to claim 2, wherein the first means comprises an infrared imaging system external to the housing which directs infrared radiation through the infrared window onto the membrane.

4. A system according to claim 2, wherein the first means comprises the infrared window which is formed as a lens.

5. A system according to claim 2, wherein the second means comprises a visible light source external to the housing which illuminates the membrane through the optical window.

6. A system according to claim 5, wherein the second means includes means for polarizing the light prior to illuminating the membrane.

7. A system according to claim 5, wherein the third means detects the light after reflection from the membrane and transmission through the optical window.

8. A system according to claim 5, wherein the housing includes a further optical window, and wherein the third means detects the light after reflection from the membrane and transmission through the further optical window.

9. A system according to claim 2, wherein the second means comprises a visible light source inside the housing.

10. A system according to claim 9, wherein the visible light source is arranged on the opposite side of the membrane to the optical window and the third means detects the light after transmission through the membrane and through the optical window.

11. A system according to claim 10, wherein the visible light source illuminates the membrane after internal reflection at the infrared window.

12. A system according to claim 4, wherein the optical window is also formed as a lens forming part of the third means.

13. A system according to claim 6, wherein the third means detects the light after reflection from the membrane and transmission through the optical window.

14. A system according to claim 6, wherein the housing includes a further optical window, and wherein the third means detects the light after reflection from the membrane and transmission through the further optical window.

15. A system according to claim 4, wherein the second means comprises a visible light source inside the housing.

16. A method of infrared imaging comprising providing a film of dichroic [liquid crystal] *material* coated on a membrane, forming an infrared image on the membrane, illuminating the membrane with visible light, and detecting variations in elliptical polarization of the light after reflection from or transmission through the membrane to provide a visible image.

17. An infrared imaging system comprising:

a film of dichroic [liquid crystal] *material* coated on a membrane;

first means for forming an infrared image on the membrane;

second means for illuminating the membrane with visible light; and third means for detecting variations in elliptical polarization of the light after reflection from or transmission through the membrane to provide a visible image, said membrane being contained within an evaluated housing, said housing including an optical window transmissive of visible wavelengths and an infrared window, said infrared window also being transmissive of visible wavelengths, said first and second means directing infrared and visible light, respectively, through said infrared window onto the membrane, and said third means detecting the light after transmission through said membrane and through said optical window.

*18. A system according to claim 1, wherein said dichroic material is liquid crystal.*

*19. A system according to claim 16, wherein said dichroic material is liquid crystal.*

*20. A system according to claim 17, wherein said dichroic material is liquid crystal.*

* * * * *